US012584414B2

(12) United States Patent
Kryj-Kos et al.

(10) Patent No.: US 12,584,414 B2
(45) Date of Patent: Mar. 24, 2026

(54) GAS TURBINE ENGINE WITH COMPOSITE AIRFOIL AND PREFORM CORE

(71) Applicant: GENERAL ELECTRIC COMPANY, Schenectady, NY (US)

(72) Inventors: Elzbieta Kryj-Kos, Liberty Township, OH (US); Nicholas Joseph Kray, Mason, OH (US); Arthur William Sibbach, Boxford, MA (US); Michael John Franks, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/447,525

(22) Filed: Aug. 10, 2023

(65) Prior Publication Data

US 2025/0052162 A1     Feb. 13, 2025

(51) Int. Cl.
*F01D 5/28* (2006.01)
*F02C 3/04* (2006.01)

(52) U.S. Cl.
CPC ................ *F01D 5/282* (2013.01); *F02C 3/04* (2013.01); *F05D 2300/603* (2013.01)

(58) Field of Classification Search
None
See application file for complete search history.

(56) References Cited

U.S. PATENT DOCUMENTS

| | | | |
|---|---|---|---|
| 5,038,291 A | 8/1991 | Wang et al. | |
| 5,279,892 A | 1/1994 | Baldwin et al. | |
| 6,450,450 B1 | 9/2002 | MacDonald et al. | |
| 7,547,194 B2 | 6/2009 | Schilling | |
| 7,828,526 B2 * | 11/2010 | Cairo | F04D 29/322 |
| | | | 416/224 |
| 8,105,042 B2 | 1/2012 | Parkin et al. | |
| 8,123,463 B2 | 2/2012 | Kray et al. | |
| 8,419,374 B2 | 4/2013 | Huth et al. | |
| 8,573,947 B2 | 11/2013 | Klinetob et al. | |
| 8,696,319 B2 | 4/2014 | Naik | |
| 9,550,332 B2 | 1/2017 | Karem | |
| 10,099,434 B2 | 10/2018 | Anderson et al. | |
| 10,865,649 B2 | 12/2020 | Thomas | |
| 11,655,758 B1 * | 5/2023 | Sobanski | F01D 9/041 |
| | | | 60/805 |
| 2011/0054850 A1 | 3/2011 | Roach | |
| 2011/0129348 A1 | 6/2011 | Parkin et al. | |
| 2014/0205463 A1 * | 7/2014 | Herraiz | F01D 5/225 |
| | | | 29/889.71 |
| 2022/0268165 A1 * | 8/2022 | Burdette | F01D 5/282 |
| 2022/0381448 A1 * | 12/2022 | Cai | F24C 15/20 |
| 2023/0040244 A1 * | 2/2023 | Li | B32B 5/12 |
| 2023/0119475 A1 * | 4/2023 | Notarianni | B29C 70/443 |
| | | | 416/230 |

* cited by examiner

*Primary Examiner* — Gerald L Sung
*Assistant Examiner* — Jacek Lisowski
(74) *Attorney, Agent, or Firm* — McGarry Bair PC

(57) ABSTRACT

A gas turbine engine includes a fan section, a compressor section, combustion section, and turbine section in serial flow arrangement, that defining an engine centerline extending between a forward direction and an aft direction. A composite component, such as an airfoil, extends between a root and a tip, defining a span-wise direction therebetween, and between a leading edge and a trailing edge, defining a chord-wise direction therebetween. The composite component includes a preform core including a first set of fibers as a first set of warp fibers and a first set of weft fibers.

18 Claims, 5 Drawing Sheets

GAS TURBINE ENGINE WITH COMPOSITE AIRFOIL AND PREFORM CORE

TECHNICAL FIELD

The present disclosure relates generally to a core, or preform thereof, for a component of a gas turbine, and more specifically to a preform for an airfoil having a woven core geometry.

BACKGROUND

A turbine engine typically includes an engine core with a compressor section, a combustor section, and a turbine section in serial flow arrangement. In a bypass turbine engine, a fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

Many components of the turbine engine are made from composite materials that can include a fiber-reinforced matrix and exhibit a high strength to weight ratio. Due to the high strength to weight ratio and moldability to adopt relatively complex shapes, composite materials are utilized in various applications, such as a turbine engine or an aircraft. Components made from composite materials can be, for example, installed on or define a portion of the fuselage and/or wings, rudder, manifold, airfoil, blades, vanes or other components of the aircraft or turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
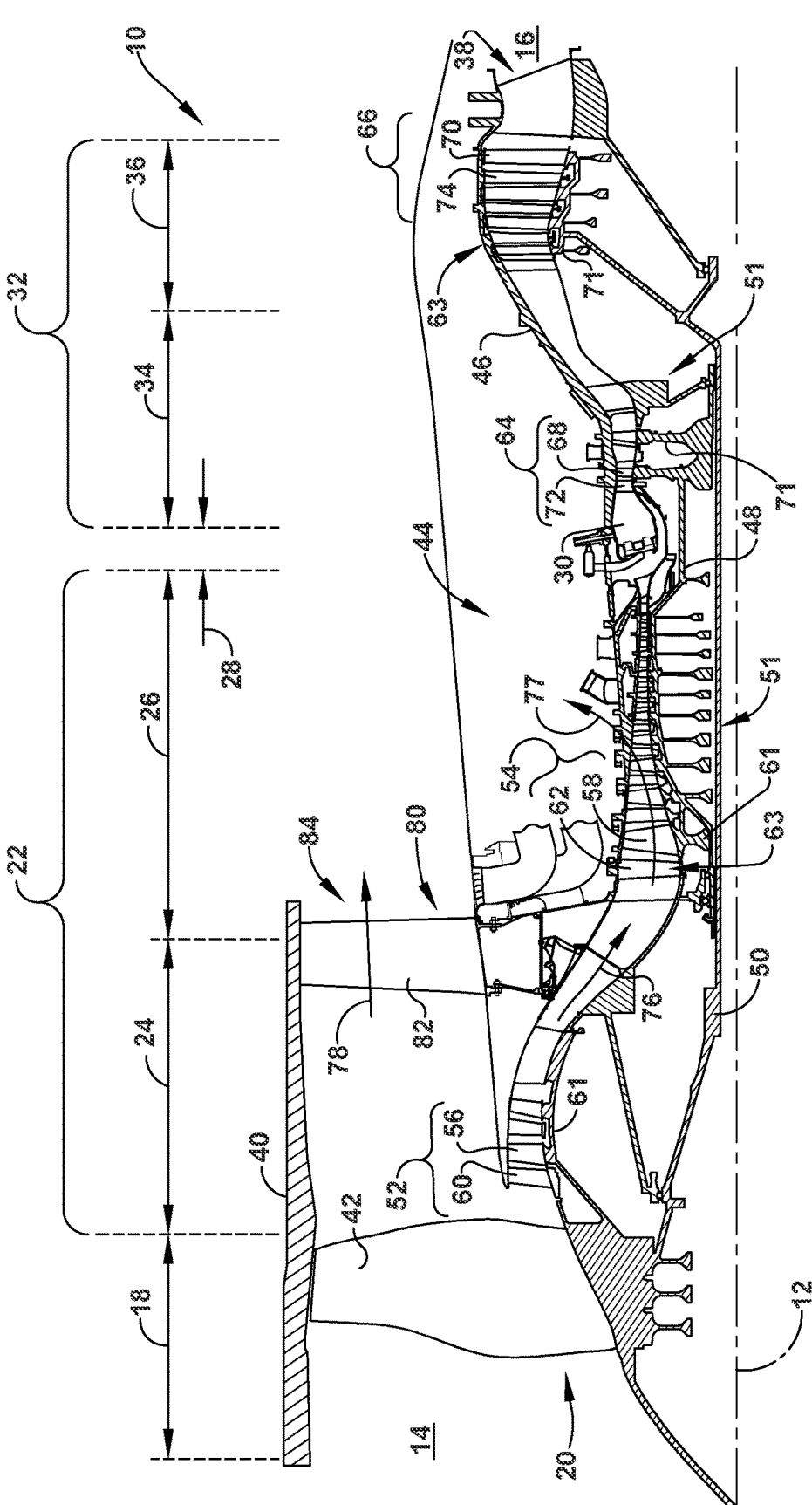
FIG. 1 is a schematic cross-sectional view of a turbine engine in accordance with an exemplary aspect of the present disclosure.

Aspects of the disclosure herein are directed to a manufactured core used for an engine component, such as an airfoil. The core can be woven, and can include additional woven layers forming the engine component. The core is used to create an engine component, or preform thereof, for a turbine engine. Such an engine component can be an airfoil, for example. It should be understood, however, that the disclosure applies to other engine components of the turbine engine, such as a combustor liner, shroud, nozzle, or a disk in non-limiting examples. Further, while described in terms of a core used in the manufacture of an airfoil or aircraft, it will be appreciated that the present disclosure is applied to any other suitable environment, such as terrestrial or non-terrestrial, airborne, land-based, or non-land-based applications.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", and "fourth" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

The term "fluid" may be a gas or a liquid, or multi-phase.

As used herein, the term "camberline" refers to a measure of the curvature of an airfoil. The camberline can be an imaginary line which lies halfway between the pressure side and the suction side, which extends between and intersects the leading edge and the trailing edge.

As used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, coaxial, front, back, top, upstream, downstream, forward, aft, etc.) as may be used herein are only used for identification purposes to aid the reader's understanding of the present disclosure, and do not create limitations, particularly as to the position, orientation, or use of aspects of the disclosure described herein. Connection references (e.g., coupled, connected) are to be construed broadly and can include intermediate structural elements between a collection of elements and relative movement between elements unless otherwise indicated. As such, connection references do not necessarily infer that those two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise.

Furthermore, as used herein, the term "set" or a "set" of elements can be any number of elements, including only one.

As used herein, the term "stiffness" may be used as defining a mechanical property which defines the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

As used herein, the term "elasticity" may be used as defining a mechanical property which defines the modulus of elasticity under tension or compression, can may relate to an elasticity for a particular material or structure made of such material, such as the engine components described herein. The elasticity can represent the stress per unit area relative to the local strain or proportional deformation thereof.

As used herein, the term "strength" may be used as defining a mechanical property defining a maximum load that can be borne by a particular element or feature without breaking, fracturing, or other deformation resultant of an experienced load. "Strength" can include a tensile strength, a shear strength, a torsional strength or a compressive strength in non-limiting examples.

As used herein, the term "hardness" may be used as defining a mechanical property that defines resistance to deformation as a result of indentation or abrasion. A hardness can include a scratch hardness, an indentation hardness, or a rebound hardness in non-limiting examples. Hardness can be measured as Newtons per square millimeter, or can be represented by a Brinell hardness number, a Vickers hardness number, or a Rockwell hardness number in non-limiting examples.

The term "composite," as used herein is, is indicative of a component having two or more materials A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in mechanical properties, material, and dimension to achieve the desired composite component or composite portion of a component having a predetermined weight, size, or mechanical property.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The inventors' practice has proceeded in the foregoing manner of designing a core used in the manufacture of a component such as an airfoil, designing the airfoil to have improved local mechanical properties or geometries, decreased weight, identifying whether or not the component was manufactured as designed and satisfies component objectives, and modifying the engine component with new or varied characteristics in an iterative process when the engine component does not satisfy component objectives. This process is repeated during the design of several different types of components, such as those shown in FIG. 1.

FIG. 1 is a schematic cross-sectional diagram of a turbine engine 10 for an aircraft. The turbine engine 10 has a generally longitudinally extending axis or engine centerline 12 extending from a forward direction 14 to an aft direction 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the greater diameter annular HP spool 48, drivingly connects the LP turbine 36 to the LP compressor 24 and fan 20. The HP and LP spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30.

A remaining portion of the airflow exiting the fan section 18, referred to as bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
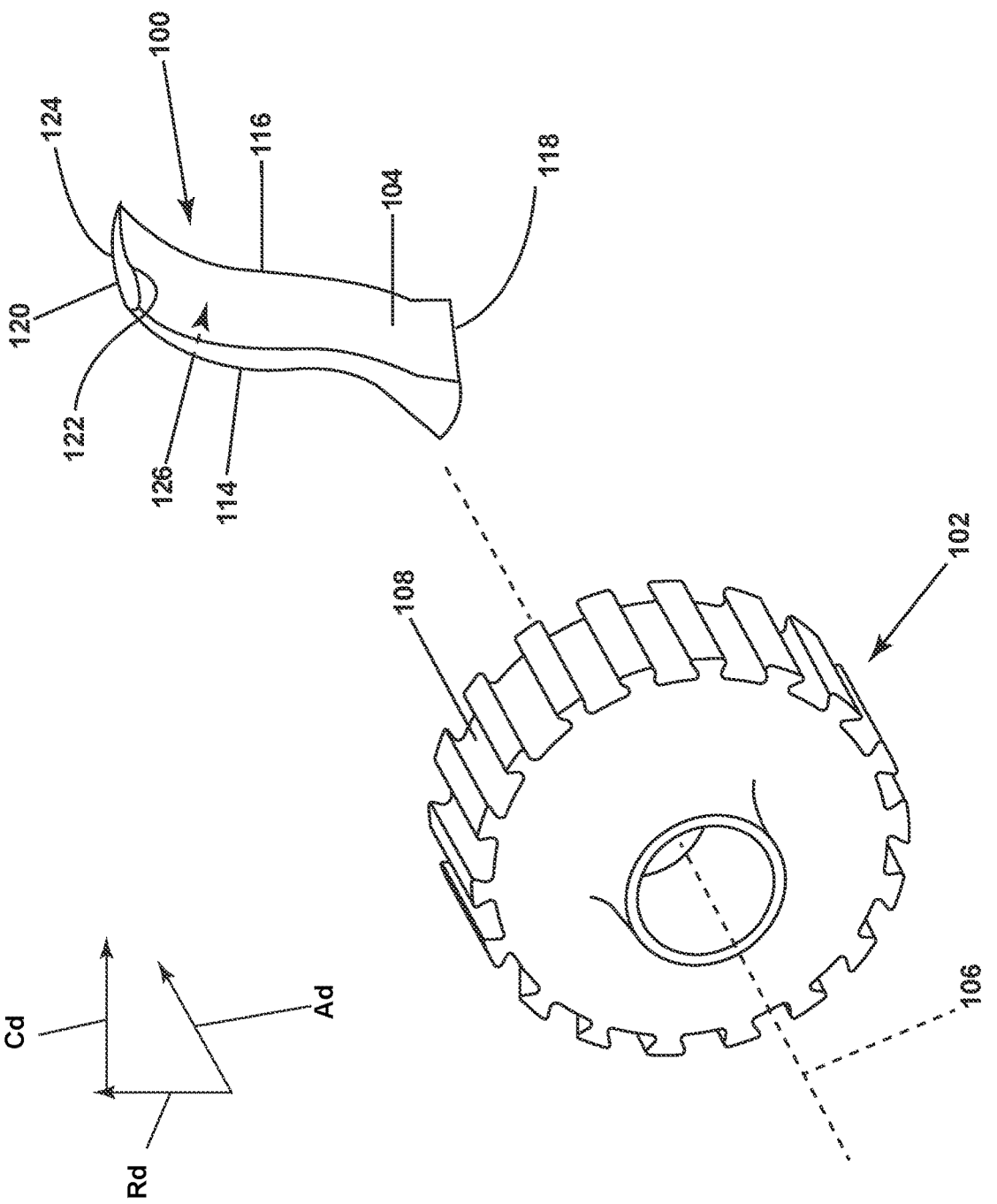
FIG. 2 is a schematic perspective view of a composite airfoil assembly and disk assembly suitable for use within the turbine engine of FIG. 1, in accordance with an exemplary aspect of the present disclosure.

FIG. 2 is a schematic perspective view of a composite airfoil 100 and a disk 102 suitable for use within the turbine engine 10 of FIG. 1. The composite airfoil 100 can define a body 104. The disk 102 is suitable for use as the disk 61, 71 (FIG. 1) or any other disk such as, but not limited to, a disk within the fan section 18, the compressor section 22, or the turbine section 32 of the turbine engine 10. The composite airfoil 100 can be rotating or non-rotating such that the composite airfoil 100 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil 100 can be a composite fan blade.

The disk 102 can be rotatable or stationary about a rotational axis 106. The rotational axis 106 can coincide with or be offset from an engine centerline (e.g., the engine centerline 12 of FIG. 1). The disk 102 includes a plurality of slots 108 extending axially through a radially outer portion of the disk 102 and being circumferentially spaced about the disk 102, with respect to the rotational axis 106.

The composite airfoil 100, and body 104 thereof, extends between a leading edge 114 and a trailing edge 116 to define a chord-wise direction, and extends between a root 118 and a tip 120 to define a span-wise direction. The composite airfoil 100 includes a pressure side 122 and a suction side 124, and can include an interior 126 defined within the composite airfoil 100.

The composite airfoil 100 couples to the disk 102 by inserting at least a portion of the composite airfoil 100 into a respective slot of the plurality of slots 108. The composite airfoil 100 is held in place by frictional contact with the slot 108 or can be coupled to the slot 108 via any suitable coupling method such as, but not limited to, welding, adhesion, fastening, or the like. While only a single composite airfoil 100 is illustrated, it will be appreciated that there can be any number of one or more composite airfoils 100 coupled to the disk 102. As a non-limiting example, there can be a plurality of composite airfoil 100 corresponding to a total number of slots of the plurality of slots 108.

For the sake of reference, a set of relative reference directions, along with a coordinate system can be applied to the composite airfoil 100. An axial direction (Ad) can extend from forward to aft and is shown extending at least partially into the page. The axial direction (Ad) and can be arranged parallel to the rotational axis 106, which can also be arranged parallel to the engine centerline 12 (FIG. 1). A radial direction (Rd) extends perpendicular to the axial direction (Ad), which can extend perpendicular to the engine centerline 12. A circumferential direction (Cd) can be defined perpendicular to the radial direction (Rd), which can be defined along a curvature of a circumference about the axial direction (Ad), can be defined as a ray extending locally from the radial direction (Rd), and/or can be defined along the circumference of the turbine engine 10 relative to the engine centerline 12 or rotational axis 106.

Figure 3:
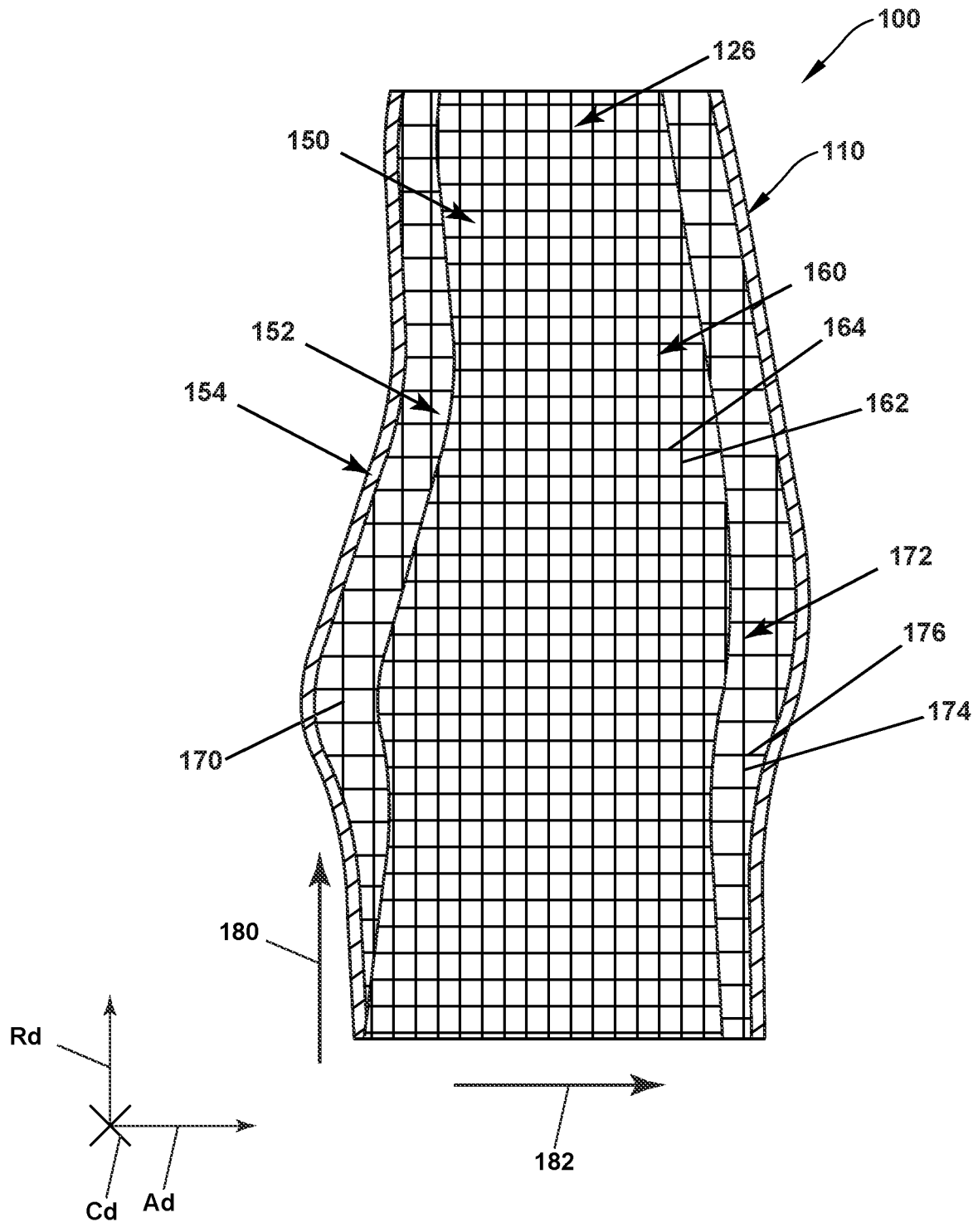
FIG. 3 is a schematic cross-sectional view of the composite airfoil assembly of FIG. 2 including a core with a set of fibers, in accordance with an exemplary aspect of the present disclosure.

FIG. 3 shows a schematic cross-sectional view exposing a composite core 110 for the composite airfoil 100 and showing the interior 126. The composite core 110 includes a preform core 150 and a skin layer 152, with a coating 154 positioned exterior of the skin layer 152. In one example, the composite core 110 can be formed by the preform core 150 without a skin layer 152.

The preform core 150 can be made at least partially of a woven structure. In one non-limiting example, the woven structure can include a first set of fibers 160 which can include a first set of warp fibers 162 and a first set of weft fibers 164. The first set of warp fibers 162 and the first set of weft fibers 164 can be interlaced or interwoven to at least partially form the preform core 150. In one non-limiting example, a Jacquard loom or 3D weaving machine can be used to create complex woven structures, which can include interweaving one or more materials or composites to form the preform core 150. Such materials or composites can include, in non-limiting examples, carbon or carbon fibers, glass or glass fibers, nylon, rayon, or other aramid fibers, while other materials such as nickel, titanium, or ceramic composites are contemplated.

In one non-limiting example, the first weave pattern can be a three-dimensional weave pattern. More specifically, the woven structure can be woven in a combination of the axial direction (Ad), the radial direction (Rd), and the circumferential direction (Cd) (FIG. 2. The axial direction (Ad) can be collinear with the engine centerline 12 (FIG. 1), and the radial direction (Rd) can be a line defined emanating perpendicular from the engine centerline 12. It should be appreciated that the weave pattern can be formed and defined separate from the turbine engine 10 (FIG. 1) and its directions (Ad, Rd, Cd), such that the weave pattern is woven in any three, mutually-orthogonal planes in order to define a three-dimensional object relative to said planes. In one non-limiting example, the three mutually orthogonal planes can include a first plane defined among the span-wise direction and the chord-wise direction, and with two additional mutually-orthogonal planes both arranged orthogonal to the first plane and to one another.

The skin layer 152 is positioned exterior of the preform core 150, and can be provided on or applied to the preform core 150. In one non-limiting example, the skin layer 152 can be formed as a plurality of laminated plies 170 upon the preform core 150. In another non-limiting example, the skin layer 152 can be a woven layer, similar to that of the preform core 150. In such an example, the weave patterns used for the preform core 150 and the skin layer 152 can be similar, identical, or dissimilar, or having discrete areas which may be similar, identical, or dissimilar with other portions of the preform core 150 or the skin layer 152. Such a woven layer includes a second set of fibers 172 including a second set of warp fibers 174 and a second set of weft fibers 176. In such an example, the skin layer 152 can be formed with a Jacquard loom or 3D weaving machine with composite materials, which can include a weave pattern or structure that can be similar or dissimilar from that of the preform core 150. In additional non-limiting examples, the skin layer 152 can be comprised of composite materials, similar or dissimilar from that of the preform core 150, such as carbon or carbon fibers, glass or glass fibers, nylon, rayon, or aramid fibers, while other materials such as nickel, titanium, or ceramic composites in non-limiting examples. The skin layer 152 can be sized and shaped to form the exterior airfoil shape, such as defining greater or lesser local thicknesses.

In yet another example, the preform core 150, the skin layer 152, or both can be woven in a braided weave pattern or a plaited weave pattern. The braided or plaited weave pattern can be formed as a woven structure, and can include a weave pattern that includes three or more interlaced fibers, tows, yarns, or strands that are woven in a repeating pattern, such as the first set of fibers 160 or the second set of fibers 172, for example. In another non-limiting example, the braided geometry can include where the first set of fibers 160 or the second set of fibers 172 are sequentially laid to define the braided geometry. In one example, the braided geometry or pattern can repeat for the entirety of the skin layer 152, or only a portion thereof, where one or more additional woven or braided geometries define the skin layer 152. In yet another example, the weave pattern for the skin layer 152 can be a woven geometry that is different the preform core 150, despite both being woven. Such a difference can include a difference in material, weave pattern, alignment, arrangement, or being offset from one another, in non-limiting examples.

The first and second sets of fibers 160, 172 forming the preform core 150 and the skin layer 152 can be arranged in a first direction 180 and a second direction 182. For example, the first set of warp fibers 162 and/or the second set of warp fibers 174 can be arranged in the first direction 180, where the first directions 180 can be aligned with the radial direction (Rd), while the second direction 182 can be aligned with the spanwise direction, in one non-limiting example. In another example, the first direction 180 can be aligned perpendicular to the engine centerline 12 (FIG. 1). In another non-limiting example, the first direction 180 can be defined extending between a midpoint of a camberline for the composite airfoil 100 at the root 118 and a midpoint of a camberline at the tip 120. In another non-limiting example, the first direction 180 can be defined projected onto a plane that is common with the first set of fibers 160, and aligned with at least one of the first set of warp fibers 162 or the first set of weft fibers 164.

The first set of weft fibers 164 and/or the second set of weft fibers 176 can be arranged in the second direction 182, which is perpendicular to the first direction 180. In one non-limiting example, the second direction 182 can be aligned with the axial direction (Ad). In additional non-limiting examples, it is contemplated that the second direction 182 be aligned with the radial direction (Rd), the circumferential direction (Cd), or the chord-wise direction.

The coating 154 can form an exterior wall. It is contemplated that one or more additional interior or exterior layers are provided interior or exterior of the coating 154, between the coating 154 and the skin layer 152, interior of the skin layer 152, or between the skin layer 152 and the preform core 150. The coating 154 can be a barrier coating, for example, to prevent erosion due to object impact, while additional properties are contemplated, such as hydrophobic or ice-phobic properties, corrosion or erosion resistance properties, or ultraviolet resistance properties. Additional finishing layers or materials can be provided on the coating 154 as may be desirable, such as oxidation or corrosion resistant coatings or paint.

During manufacture, the preform core 150 and/or the skin layer 152 can be formed defining a specific woven structure. The first and second sets of fibers 160, 172 are arranged in two mutually-orthogonal directions, illustrated as the first direction 180 being aligned with the radial direction (Rd) or the span-wise direction, and a second direction 182 being aligned with the axial direction (Ad) or the chord-wise direction. The specific woven structure can be specified to have a predetermined geometry and arrangement for the first and second sets of fibers 160, 172, and/or can be cut or otherwise sized and shaped after manufacture of the woven structure, such as by cutting or grinding the preform core 150 to a desired shape. Such cutting or sizing can be used to create or define a shape or preform for the composite core 110, which can include the preform core 150, the skin layer 152, or both.

Figure 4:
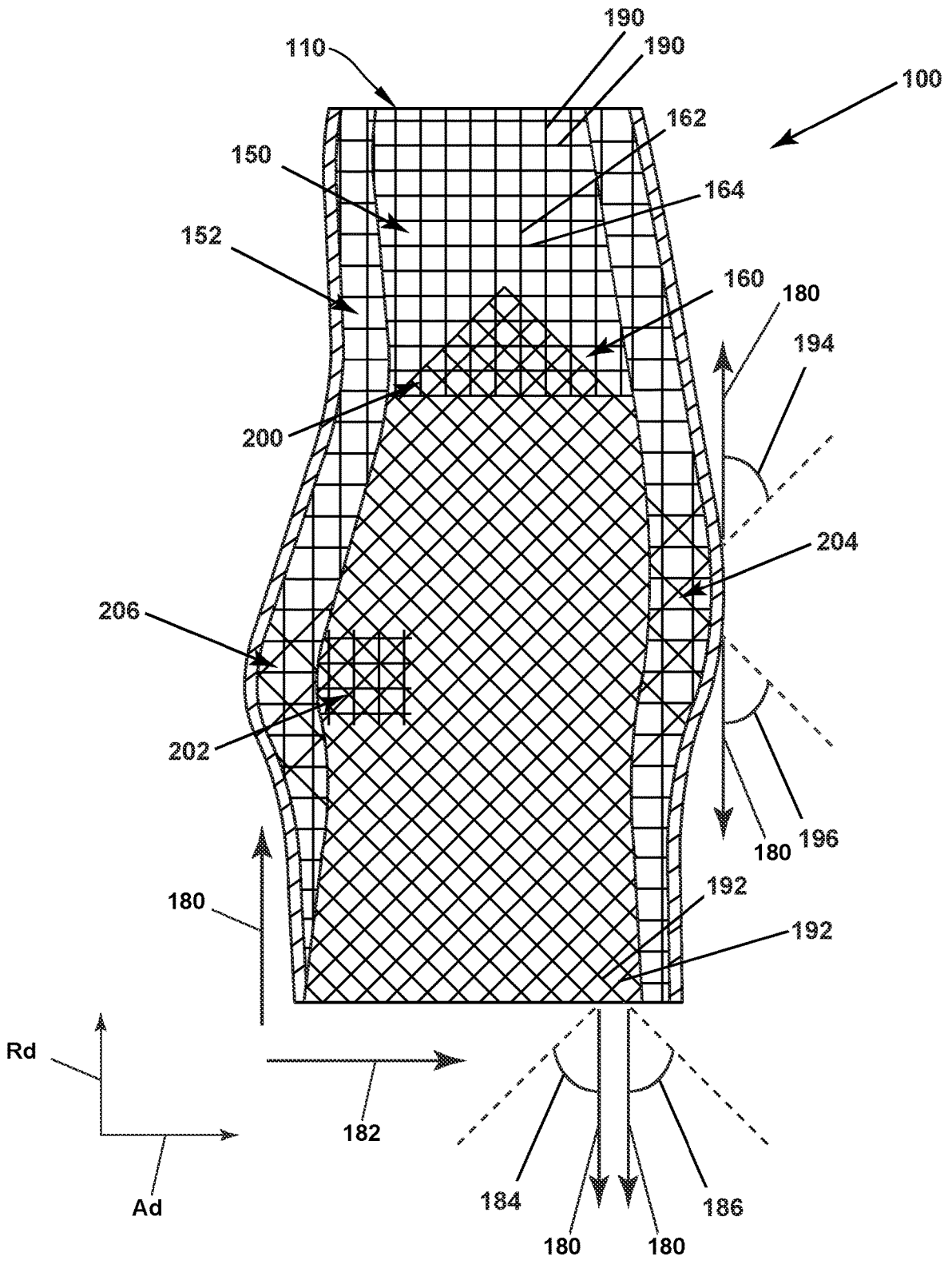
FIG. 4 is another schematic cross-sectional view of the composite airfoil assembly of FIG. 2 including the set of fibers of FIG. 3 arranged at an angle, in accordance with an exemplary aspect of the present disclosure.

FIG. 4 shows another schematic sectional view of the composite core 110 for the composite airfoil 100. The first set of fibers 160 further include a set of chord-wise fibers 190 aligned with the first direction 180 and the second direction 182, and having other fibers 192 arranged at a first angle 184 and a second angle 186 relative to the first direction 180. The fibers 192 arranged at the first angle 184 and the second angle 186 can be offset from the first direction 180 or the second direction 182, or both. In one non-limiting example, the first angle 184 can vary among thirty-five degrees to sixty-five degrees (35° to 65°), and the second angle 186 can vary among negative thirty-five degrees to negative sixty-five degrees (−35° to −65°). It should be understood that a negative angle is represented as extending in a locally forward direction, and a positive angle is represented as extending in a locally aft direction, where the radial direction (Rd) represents a zero-degree value. Alternatively, a negative angle may represent orientation in a direction opposite of that of a positive angle, relative to a common axis, as can be appreciated by one having ordinary skill in the art.

In one non-limiting example, at least 20% of a fiber volume of the first set of fibers 160 forming the preform core 150 can be arranged at the first angle 184 and at least 20% of a fiber volume for the preform core 150 can be arranged at the second angle 186. In such an example, at least 40% of the fiber volume of the first set of fibers 160 can be arranged at the first angle 184 and the second angle 186.

In another non-limiting example, at least some of the second set of fibers 172 forming the skin layer 152 can be arranged at a third angle 194 and a fourth angle 196, such that third angle 194 for the second set of warp fibers 174 can vary among thirty-five degrees to sixty-five degrees (35° to 65°), and the fourth angle 196 for the second set of weft fibers 176 can vary among negative thirty-five degrees to negative sixty-five degrees (−35° to −65°).

In another non-limiting example, at least 20% of the fiber volume for the skin layer 152 can be arranged at the third angle 194, and at least 20% of the fiber volume of the skin layer 152 can be arranged at the fourth angle 196. In yet another non-limiting example, at least 40% of the total volume or mass for the skin layer 152 can be arranged at the third angle 194 or the fourth angle 196.

In one non-limiting example, additional layers, sheets, volumes, or regions can include additional sets of fibers, similar to the first set of fibers 160 or the second set of fibers 172. For example, a first region 200 has some of the first set of fibers 160 arranged at the first and second angle 184, 186, added, provided with, through, among, or over other fibers of the first set of fibers 160 which are aligned with the span-wise and chord-wise directions, and not arranged at the first and second angles 184, 186. The additional added fibers at the first and second angles 184, 186 can define the first region 200, and can provide a local increase in thickness, which can be used to define three-dimensional shapes for the preform core 150. In another non-limiting example, a second region 202 can include additional fibers arranged at the first and second angle 184, 186. Such additional fibers within the second region 202 can be arranged at a similar first and second angle 184, 186 as the first region 200, while differing angles among different regions are contemplated. The second region 202 includes at least some of the first set of fibers 160 that are not arranged at the first and second angles 184, 186, in addition to the first set of fibers 160 that are arranged at the first and second angles 184, 186. These local additions can determine local geometries for the composite airfoil 100 or the composite core 110. Additionally, the additions defining the first or second regions 200, 202 can be used to define a mechanical property for the composite airfoil 100 or the composite core 110, including but not limited to increased, decreased, or varied local thicknesses, stiffnesses, elasticities, hardnesses, strengths, centers of rotation, or centers of mass in non-limiting examples. Determining these mechanical properties can be achieved through the use of different materials, geometries, weave patterns, or positions, orientations, or amounts of the first set of fibers 160, the first set of warp fibers 162, or the first set of weft fibers arranged at the first and second angles 184, 186.

Similarly, additional sets of fibers, such as the second set of fibers 172 arranged at the third angle 194 and the fourth angle 196 can be locally added to a third region 204 or a fourth region 206 provided with, through, among, or over other fibers for the second set of fibers 172 that are not arranged at the third angle 194 and the fourth angle 196. These additional fibers can also be used to determine local geometries for the composite airfoil 100 or the composite core 110 for the skin layer 152, such as defining mechanical properties including but not limited to increased, decreased, or varied local thicknesses, stiffnesses, elasticities, strengths, centers of rotation, or centers of mass in non-limiting examples.

In one non-limiting example, the composite core 110 can be formed as a preform. "Preform" as used herein is a three-dimensional composite formed by a plurality of fibers or yarns, including warp fibers or yarns and weft fibers or yarns. Additionally, at least some fibers or yarns are arranged at an offset angle to the warp and weft fibers or yarns, which can vary among 35° to 65° or −35° to −65°. The fibers or yarns, or at least some thereof, can be integrated into the preform through weaving, stitching, tufting, or any appropriate manufacturing process. The preform as referenced herein is a fully formed component that is formed in a separate manufacturing process with respect to the fully formed component.

The composite core 110 as a preform can include the preform core 150, and may or may not include the skin layer 152, or other layers (not shown). The preform can be formed with the first and second sets of fibers 160, 172 at the first, second, third, and/or fourth angles 184, 186, 194, 196, and then can be otherwise sized, cut, finished, or treated in order to form the composite core 110. Using the composite core 110 as a preform can provide for creating a core for an airfoil or other engine component which can be finished in order to form the composite airfoil or engine component. The preform can include a resin transfer molding, a precured resin transfer molding, a prepreg laminate, or a dry perform and prepreg formed by same qualified resin transfer molding in non-limiting examples.

Utilizing one or more sets of fibers, such as the first and second sets of fibers 160, 172 at the first, second, third, and/or fourth angles 184, 186, 194, 196 can provide for achieving variable local thicknesses, material compositions, geometries, orientations, physical properties, or mechanical properties such as stiffnesses, elasticities, hardnesses, strengths, centers of rotation, or centers of mass in non-limiting examples. The addition of as the first and second sets of fibers 160, 172 at the first, second, third, and/or fourth angles 184, 186, 194, 196 provides for incorporating the additional material to define the local thicknesses, geometries, or orientations of the fibers in order to vary one or more mechanical properties. Additionally, utilizing different weave patterns, angles for the fibers, amounts of angled fibers, or different materials can provide for varying the mechanical properties of the material forming the composite airfoil 100, which can provide for varying the stiffnesses, hardness, elasticity, or strength for the composite core 110. Varying the local physical or mechanical properties can be achieved by varying the materials used in the fibers, in addition to arranging at least 20% of the fiber volume at the first, second, third, and/or fourth angles 184, 186, 194, 196. In another example, using the first and second sets of fibers 160, 172 at the first, second, third, and/or fourth angles 184, 186, 194, 196 can vary the natural frequency for the composite airfoil 100 or the composite core 110 thereof. Tuning the vibrational frequencies for the composite airfoil 100 can reduce vibration or vary vibrational frequencies to those that are outside of operating conditions for the composite airfoil 100. Such tuning of the natural frequency can reduce susceptibility to vibrational wear or fatigue, as well as increasing component lifetime and reducing overall maintenance. Further, varying or moving the center of rotation or mass for the composite airfoil 100 through the addition of the first and second sets of fibers 160, 172 at the first, second, third, and/or fourth angles 184, 186, 194, 196 can provide for increased or improved balance for the composite airfoil 100, which can increase operational efficiency and component lifetime.

Figure 5:
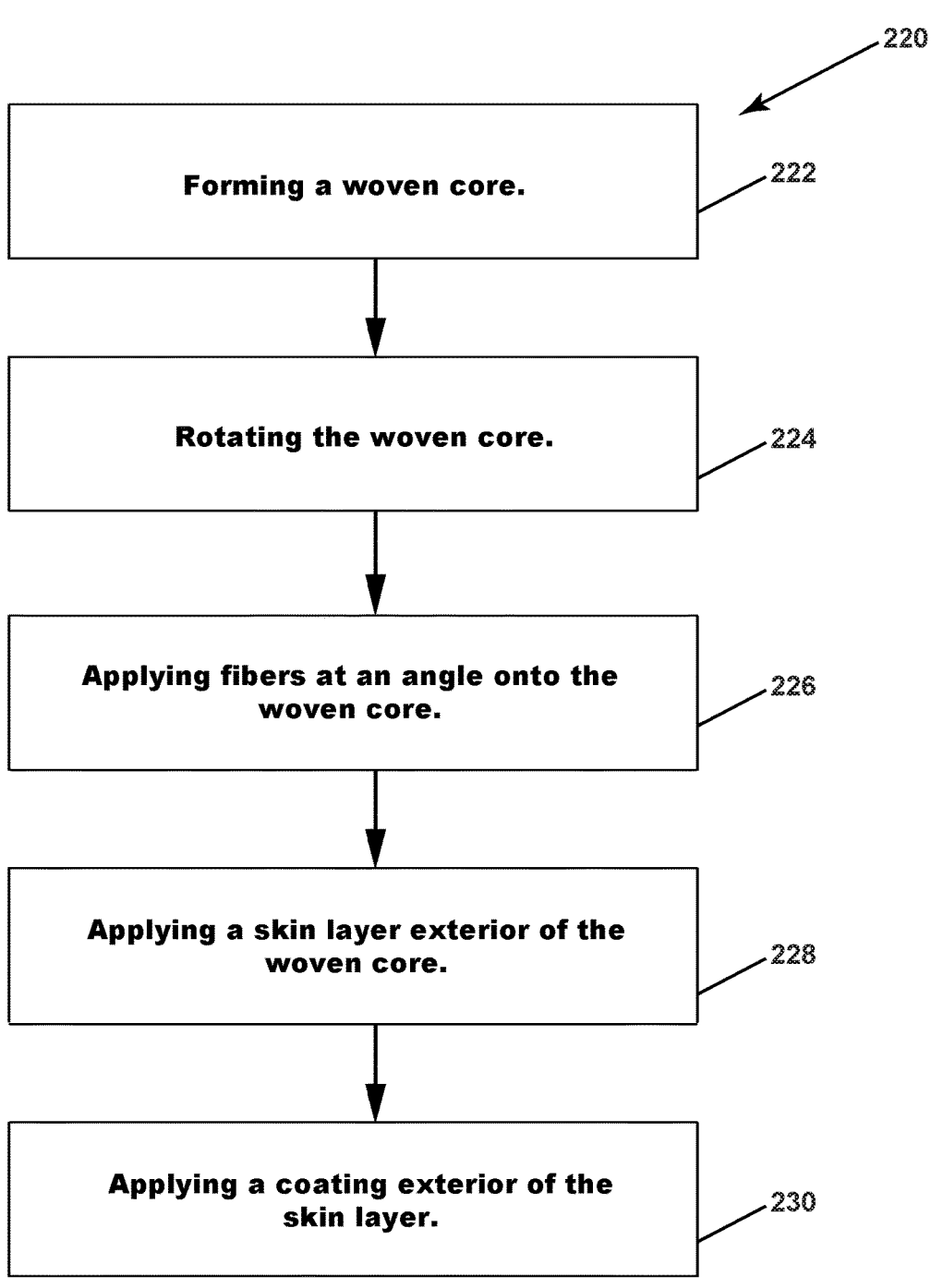
FIG. 5 is a flow chart depicting a method of forming a component, in accordance with an exemplary aspect of the present disclosure.

FIG. 5 shows a flow chart depicting a method 220 of forming a component, such as the composite airfoil 100 or the composite core 110 described herein. The method 220, at 222, includes forming a preform core for the component, such as the preform core 150 (FIGS. 3-4). The preform core 150 can be at least partially formed from fibers, such as the first set of fibers 160 (FIGS. 3-4) extending in the first and second directions 180, 182 (FIG. 3). In one non-limiting example, the fibers can be woven, defining a woven preform core. Forming the preform core 150 can further include applying the first set of fibers in a first direction 180 (FIG. 3) or the second direction 182 (FIG. 3), for example. A machine, such as a Jacquard loom or 3D weaving machine can be used to create the preform core 150, in non-limiting examples.

At 224, the method 220 can include rotating the preform core 150. Rotation of the preform core 150 can be achieved by rotation of the machine forming the preform core 150, or by rotation of the individual component (i.e., the preform core 150) by the machine or by a person operating the machine, or other rotation in order to orient the preform core 150 at an angular position. Such rotation of the preform core 150 defines the angle of the fibers being applied to the preform core 150, such as the first set of fibers 160 (FIG. 4) being oriented the fibers at the first angle 184 (FIG. 4) or the second angle 186 (FIG. 4).

At 226, the method 220 can include applying fibers at an angle onto the preform core 150. After rotating the preform core 150 at 224, the first set of fibers 160, including the first sets of warp and weft fibers 162, 164, are applied at the first angle 184 and/or the second angle 186, arranged at the first angle 184 and/or the second angle 186. The first angle 184 can vary among thirty-five degrees to sixty-five degrees (35° to 65°), and the second angle 186 can vary among negative thirty-five degrees to negative sixty-five degrees (−35° to −65°). In one non-limiting example, at least 20% of the fiber volume for the preform core 150 can be arranged at the first angle 184 and at least 20% of the fiber volume for the preform core 150 can be arranged at the second angle 186. Additionally, it is contemplated that at least a portion of the preform core 150 is formed using a braided geometry.

At 228, the method 220 can include applying a skin layer, such as the skin layer 152 (FIGS. 3-4), exterior of the preform core 150. The skin layer 152 can be formed as a set of plies or a plurality of plies, in one non-limiting example. In another non-limiting example, the skin layer 152 can be applied as a set of fibers, such as the second set of fibers 172 (FIGS. 3-4) including the second set of warp fibers 174 and the second set of weft fibers 176. At least some of the second set of fibers 172 can be aligned with the first direction 180 and the second direction 182, and at least some of the second set of fibers 172 can be arranged at the third angle 194 and the fourth angle 196. The third angle 194 for the second set of warp fibers 174 can vary among thirty-five degrees to sixty-five degrees (35° to 65°), and the fourth angle 196 for the second set of weft fibers 176 can vary among negative thirty-five degrees to negative sixty-five degrees (−35° to −65°). In one non-limiting example, at least 20% of the fiber volume for the skin layer 152 can be arranged at the third angle 194 and at least 20% of the fiber volume for the skin layer 152 can be arranged at the fourth angle 196. Additionally, it is contemplated that at least a portion of the skin layer 152 is formed using a braided geometry.

At 230, the method 220 can include applying a coating, such as the coating 154 (FIG. 3), exterior of the skin layer 152. The coating 154 can be applied to the exterior of the skin layer 152. The coating 154 can form an exterior wall. The coating 154 can be a barrier coating, for example, to prevent erosion due to object impact, while additional properties are contemplated, such as hydrophobic or ice-phobic properties, corrosion or erosion resistant properties, or ultraviolet resistant properties. Additional finishing layers or materials can be provided on the coating 154 as may be desirable, such as oxidation or corrosion resistant coatings or paint.

The benefits associated with utilizing the preform core 150 or skin layer 152 that incorporate fibers arranged at an angle, can provide for achieving variable local thicknesses, materials, geometries, orientations, physical properties, or mechanical properties. In another example, using the first and second sets of fibers 160, 172 at the first, second, third, and/or fourth angles 184, 186, 194, 196 can tune local vibrational frequencies for the composite airfoil 100 or the composite core 110, and can vary the natural frequency for the composite airfoil 100. Utilizing at least 40% of the fibers at an angled orientation relative to the remaining fibers can achieve such tuning of the natural frequencies, or utilizing at least 20% of the warp fibers and 20% of the weft fibers totaling at least 40% of the total fibers. Varying the natural frequency can provide for tuning of the composite airfoil 100 such that the composite airfoil 100 is less susceptible to vibrational wear or fatigue, as well as increasing component lifetime and reducing overall maintenance. Varying the natural frequency can be accomplished through the use of the first and second sets of fibers 160, 172 at the first, second, third, and/or fourth angles 184, 186, 194, 196. Utilizing the angled fibers provide for moving the centers of rotation or mass to provide for greater or improved balance for the composite airfoil 100 or the composite core 110, which can increase operational efficiency and component lifetime.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a fan section, a compressor section, combustion section, and turbine section in serial flow arrangement, and defining an engine centerline extending between a forward direction and an aft direction; and a composite airfoil provided in one of the fan section, the compressor section, or the turbine section, the composite airfoil extending between a root and a tip, defining a span-wise direction therebetween, and extending between a leading edge and a trailing edge, defining a chord-wise direction therebetween, the composite airfoil comprising: a preform core including a first set of fibers comprising a first set of warp fibers and a first set of weft fibers; wherein at least 40% of a volume of the first set of fibers is arranged at a first angle relative to the span-wise direction, and wherein the first angle varies among thirty-five degrees to sixty-five degrees (35° to 65°) or varies among negative thirty-five degrees to negative sixty-five degrees (−35° to −65°).

The gas turbine engine of any preceding clause wherein an angle for the first set of warp fibers varies among thirty-five degrees to sixty-five degrees (35° to 65°) and an angle for the first set of weft fibers varies among negative thirty-five degrees to negative sixty-five degrees (−35° to −65°).

The gas turbine engine of any preceding clause wherein the first set of warp fibers forms at least 20% of the volume of the first set of fibers, and wherein the first set of weft fibers forms at least 20% of the volume of the first set of fibers.

The gas turbine engine of any preceding clause wherein the first set of warp fibers is aligned with the span-wise direction.

The gas turbine engine of any preceding clause wherein the first set of weft fibers is aligned with the chord-wise direction.

The gas turbine engine of any preceding clause wherein the first set of fibers of the preform core includes a braided weave pattern.

The gas turbine engine of any preceding clause wherein the composite airfoil further comprises a skin layer positioned exterior of the preform core.

The gas turbine engine of any preceding clause wherein the skin layer comprises a second set of fibers comprising a second set of warp fibers and a second set of weft fibers.

The gas turbine engine of any preceding clause wherein 40% of a volume of the second set of fibers is arranged at an angle relative to the span-wise direction, and wherein the angle varies among thirty-five degrees to sixty-five degrees (35° to 65°) or varies among negative thirty-five degrees to negative sixty-five degrees (−35° to −65°).

The gas turbine engine of any preceding clause wherein an angle for the second set of warp fibers varies among thirty-five degrees to sixty-five degrees (35° to 65°) and angle for the second set of weft fibers varies among negative thirty-five degrees to negative sixty-five degrees (−35° to −65°).

The gas turbine engine of any preceding clause wherein the second set of warp fibers form at least 20% of the volume of the second set of fibers, and wherein the second set of weft fibers form at least 20% of the volume of the second set of fibers.

The gas turbine engine of any preceding clause wherein the skin layer is a woven layer.

The gas turbine engine of any preceding clause wherein the skin layer includes a braided weave pattern.

The gas turbine engine of any preceding clause wherein the composite airfoil further comprises a coating positioned exterior of the skin layer.

The gas turbine engine of any preceding clause wherein the preform core includes a first region including at least some of the first set of fibers and defining a first local increase in thickness.

The gas turbine engine of any preceding clause wherein the preform core includes a second region including at least some of the first set of fibers.

The gas turbine engine of any preceding clause wherein the angle for the first set of fibers in the second region is different than the angle for the first set of fibers in the first region.

The gas turbine engine of any preceding clause wherein the local increase in thickness defines the three-dimensional shape for the preform core.

The gas turbine engine of any preceding clause wherein the skin layer includes a third region including at least some of the second set of fibers and defining a second local increase in thickness.

The gas turbine engine of any preceding clause wherein the skin layer includes a fourth region including at least some of the second set of fibers.

The gas turbine engine of any preceding clause wherein an angle for the second set of fibers in the third region is different than an angle for the second set of fibers in the fourth region.

The gas turbine engine of any preceding clause wherein at least one of the first local increase in thickness or the second local increase in thickness vary mechanical properties for the preform core or the skin layer.

A composite airfoil comprising: a body extending between a root and a tip, defining a span-wise direction therebetween, and extending between a leading edge and a trailing edge, defining a chord-wise direction therebetween; and a preform core including a first set of warp fibers, a first set of weft fibers, a second set of warp fibers, and a second set of weft fibers; wherein the first set of warp fibers extends in a first direction and the first set of weft fibers extends in a second direction; wherein the second set of warp fibers is arranged at a first angle that varies among thirty-five degrees to sixty-five degrees (35° to 65°) relative to the first direction; and wherein the second set of weft fibers is arranged at a second angle that varies among negative thirty-five degrees to negative sixty-five degrees (−35° to −65°) relative to the first direction.

The composite airfoil of any preceding clause wherein at least 20% of a volume of the preform core is formed from the second set of warp fibers.

The composite airfoil of any preceding clause wherein at least 20% of the volume of the preform core is formed from the second set of weft fibers.

The composite airfoil of any preceding clause wherein the first direction is aligned with the span-wise direction.

The composite airfoil of any preceding clause wherein the second direction is aligned with the chord-wise direction.

The composite airfoil of any preceding clause wherein at least 40% of the volume of the preform core is formed of the second set of warp fibers and the second set of weft fibers.

A method of forming a composite core for a composite airfoil for a turbine engine extending in a span-wise direction between a root and a tip, and extending in a chord-wise direction between a leading edge and a trailing edge, the method of forming the composite core comprising: applying a first set of fibers wherein the first set of fibers includes a first set of warp fibers arranged in a first direction and a first set of weft fibers a second direction perpendicular to the first direction; and applying a second set of fibers wherein the second set of fibers includes a second set of warp fibers arranged at a first angle that varies among thirty-five degrees to sixty-five degrees (35° to 65°) relative to the first direction, and includes a second set of weft fibers arranged at a second angle that varies among negative thirty-five degrees to negative sixty-five degrees (−35° to −65°) relative to the first direction.

The method of any preceding clause wherein the second set of warp fibers forms at least 20% of a volume of the composite core.

The method of any preceding clause wherein the second set of weft fibers forms for at least 20% of the volume of the composite core.

The method of any preceding clause wherein the second set of fibers forms for at least 40% of a volume of the composite core.

The method of any preceding clause further comprising rotating the composite core.

The method of any preceding clause wherein rotating the composite core defines the first angle and the second angle.

The method of any preceding clause further comprising applying a skin layer exterior of the composite core.

The method of any preceding clause wherein the skin layer includes a third set of fibers having a third set of warp fibers and a third set of weft fibers.

The method of any preceding clause wherein at least 20% of a volume of the third set of warp fibers are arranged at a third angle and at least 20% of the volume of the third set of weft fibers are arranged at a fourth angle.

The method of any preceding clause wherein the third set of warp fibers are arranged at the third angle that varies among thirty-five degrees to sixty-five degrees (35° to 65°) relative to the first direction, and the third set of weft fibers arranged at the fourth angle that varies among negative thirty-five degrees to negative sixty-five degrees (−35° to −65°) relative to the first direction.

The method of any preceding clause wherein the second set of fibers comprise at least one of carbon, glass, nylon, rayon, aramid, nickel, titanium, or ceramic.

The method of any preceding clause wherein the first angle and the second angle defines a stiffness, elasticity, or strength for the composite core.

The method of any preceding clause wherein the first set of fibers and the second set of fibers form a preform.

The method of any preceding clause wherein the preform includes a resin transfer molding, a precured resin transfer molding, a prepreg laminate, or a dry perform and prepreg formed by same qualified resin transfer molding.

A preform for a component in a turbine engine, the preform comprising: a preform core extending in a first direction and a second direction perpendicular to the first direction, the preform core comprising: a first set of warp fibers aligned with the first direction; a first set of warp fibers aligned with the second direction; a second set of warp fibers arranged at a first angle that varies among thirty-five degrees to sixty-five degrees (35° to 65°) relative to the first direction; and a second set of weft fibers arranged at a second angle that varies among negative thirty-five degrees to negative sixty-five degrees (−35° to −65°) relative to the first direction.

The preform of any preceding clause wherein at least 20% of a volume of the preform core is formed from the second set of warp fibers.

The preform of any preceding clause wherein at least 20% of the volume of the preform core is formed from the second set of weft fibers.

The preform of any preceding clause wherein at least 40% of the volume of the preform core is formed of the second set of warp fibers and the second set of weft fibers.

The preform of any preceding clause further comprising a skin layer arranged exterior of the preform core.

The preform of any preceding clause wherein the skin layer comprises a third set of fibers comprising a third set of warp fibers and a third set of weft fibers.

The preform of any preceding clause wherein 40% of a volume of the third set of fibers is arranged at a third angle relative to the first direction, and wherein the third angle varies among thirty-five degrees to sixty-five degrees (35° to 65°) or varies among negative thirty-five degrees to negative sixty-five degrees (−35° to −65°) relative to the first direction.

The preform of any preceding clause wherein the third angle for the third set of warp fibers varies among thirty-five degrees to sixty-five degrees (35° to 65°) and the third angle for the third set of weft fibers varies among negative thirty-five degrees to negative sixty-five degrees (−35° to −65°).

The preform of any preceding clause wherein the third set of warp fibers form at least 20% of the volume of the third set of fibers, and wherein the third set of weft fibers form at least 20% of the volume of the third set of fibers.

The preform of any preceding clause wherein the skin layer includes a braided weave pattern.

The preform of any preceding clause wherein the preform core is at least partially formed by a resin transfer molding, a precured resin transfer molding, a prepreg laminate, or a dry perform and prepreg formed by same qualified resin transfer molding.

What is claimed is:

1. A gas turbine engine comprising:
a fan section, a compressor section, combustion section, and turbine section in serial flow arrangement, and defining an engine centerline extending between a forward direction and an aft direction; and
a composite airfoil provided in one of the fan section, the compressor section, or the turbine section, the composite airfoil extending between a root and a tip, defining a span-wise direction therebetween, and extending between a leading edge and a trailing edge, defining a chord-wise direction therebetween, the composite airfoil comprising:
a preform core including a first set of fibers comprising a first set of warp fibers interwoven with a first set of weft fibers, and the first set of fibers comprising a second set of warp fibers interwoven with a second set of weft fibers; and
a region of the preform core having an increased local thickness defined by the second set of warp fibers and the second set of weft fibers being interwoven with the first set of warp fibers and the first set of weft fibers;
wherein at least 40% of a volume of the first set of fibers is arranged at a first angle relative to the span-wise direction, and wherein the first angle varies among thirty-five degrees to sixty-five degrees (35° to) 65° or varies among negative thirty-five degrees to negative sixty-five degrees (−35° to)−65°.

2. The gas turbine engine of claim 1 wherein an angle for the first set of warp fibers varies among the thirty-five degrees to sixty-five degrees (35° to) 65° and an angle for the first set of weft fibers varies among the negative thirty-five degrees to negative sixty-five degrees (−35° to)−65°.

3. The gas turbine engine of claim 2 wherein the first set of warp fibers forms at least 20% of the volume of the first set of fibers, and wherein the first set of weft fibers forms at least 20% of the volume of the first set of fibers.

4. The gas turbine engine of claim 1 wherein at least some of the first set of warp fibers are not arranged at the first angle, and wherein the at least some of the first set of warp fibers that are not arranged at the first angle are aligned with the span-wise direction.

5. The gas turbine engine of claim 4 wherein at least some of the first set of weft fibers are not arranged at the first angle, and wherein the at least some of the first set of weft fibers that are not arranged at the first angle is aligned with the chord-wise direction.

6. The gas turbine engine of claim 1 wherein the first set of fibers of the preform core includes a braided weave pattern.

7. The gas turbine engine of claim 1 wherein the composite airfoil further comprises a skin layer positioned exterior of the preform core.

8. The gas turbine engine of claim 7 wherein the skin layer is a woven layer.

9. The gas turbine engine of claim 8 wherein the skin layer includes a braided weave pattern.

10. The gas turbine engine of claim 7 wherein the composite airfoil further comprises a coating positioned exterior of the skin layer.

11. The gas turbine engine of claim 1 wherein 40% of a volume of the second set of warp fibers and the second set of weft fibers arranged at a second angle relative to the span-wise direction, and wherein the second angle varies among thirty-five degrees to sixty-five degrees (35° to) 65° or varies among negative thirty-five degrees to negative sixty-five degrees (−35° to)−65°.

12. The gas turbine engine of claim 11 wherein an angle for the second set of warp fibers varies among the thirty-five degrees to sixty-five degrees (35° to) 65° and an angle for the second set of weft fibers varies among the negative thirty-five degrees to negative sixty-five degrees (−35° to)−65°.

13. A preform for a component in a turbine engine, the preform comprising:

a preform core extending in a first direction and a second direction perpendicular to the first direction, the preform core comprising:

a first set of warp fibers aligned with the first direction;

a first set of weft fibers aligned with the second direction;

a second set of warp fibers interwoven with the first set of warp fibers and the first set of weft fibers;

a second set of weft fibers interwoven with the first set of warp fibers and the first set of weft fibers; and a region of the preform core having an increased local thickness, the increased local thickness defined by the second set of warp fibers and the second set of weft fibers interwoven with the first set of warp fibers and the first set of weft fibers;

wherein the second set of warp fibers are arranged at a first angle that varies among thirty-five degrees to sixty-five degrees (35° to) 65° relative to the first direction and wherein the second set of weft fibers are arranged at a second angle that varies among negative thirty-five degrees to negative sixty-five degrees (−35° to)−65° relative to the first direction.

14. The preform of claim 13 wherein at least 20% of a volume of the preform core is formed from the second set of warp fibers.

15. The preform of claim 14 wherein at least 20% of the volume of the preform core is formed from the second set of weft fibers.

16. The preform of claim 13 wherein at least 40% of a volume of the preform core is formed of the second set of warp fibers and the second set of weft fibers.

17. The preform of claim 13 further comprising a skin layer arranged exterior of the preform core.

18. The preform of claim 17 wherein the skin layer further comprises a third set of fibers comprising a third set of warp fibers and a third set of weft fibers.

* * * * *